UNITED STATES PATENT OFFICE.

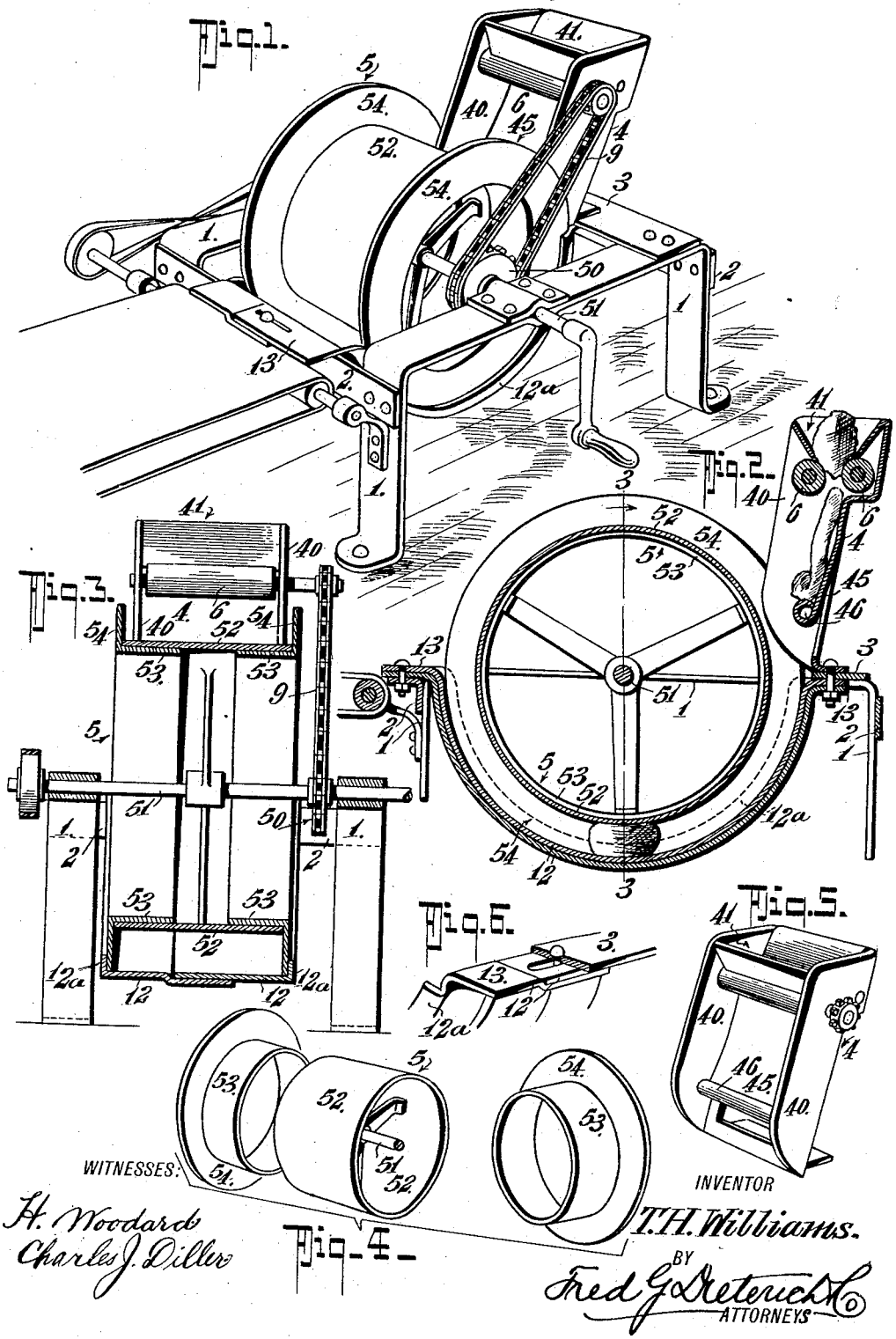

THOMAS H. WILLIAMS, OF EUGENE, OREGON.

DOUGH-SHAPING APPLIANCE.

1,111,631.   Specification of Letters Patent.   Patented Sept. 22, 1914.

Application filed July 2, 1913. Serial No. 776,908.

*To all whom it may concern:*

Be it known that I, THOMAS H. WILLIAMS, residing at Eugene, in the county of Lane and State of Oregon, have invented certain new and useful Improvements in Dough-Shaping Appliances, of which the following is a specification.

This invention relates to means for shaping dough into loaf or other shape ready for baking and it more particularly has for its object to improve the construction of loaf-maker for bread disclosed in my Patent #901,577, dated October 20, 1908.

Another object of my present invention is to provide a simple, inexpensive and easily manipulated means for forming the dough particles into a neat and uniform shape and in which the parts as so designed whereby they may be easily adjusted for shaping up different sized loaves.

With other objects in view that will hereinafter appear, my present invention comprises a dough shaping means that embodies the peculiar arrangement and novel combination of parts all of which will be hereinafter specifically pointed out in the appended claim and illustrated in the accompanying drawings, in which:

Figure 1 is a perspective view of my improved dough shaping machine. Fig. 2 is a central longitudinal section thereof. Fig. 3 is a transverse section of the same on the line 3—3 of Fig. 2. Fig. 4 is a perspective view of the shaping drum, the several sections thereby being shown separated. Fig. 5 is a perspective view of the dough chute or guide and the dough retarder. Fig. 6 is a perspective view of a portion of one end of the concaved bed members and a part of the supporting frame upon which the said members are adjustably mounted.

In carrying out my present invention, the body or supporting portion, as well as the dough shaping members, are preferably shaped up from heavy sheet metal, the frame consisting of two opposite ⌐⌐ shaped members 1—1, connected near the upper edge and at the opposite ends by the cross bars 2, riveted or in any other manner, made fast to the said members 1.

3 designates a bed piece that extends transversely of and is made fast to the rear top ends of the members 1, and upon the said bed piece is mounted a vertically projected and rearwardly inclined chute or guideway 4 that includes opposite side flanges 40, that project over the front edge of the bed piece 3 and between the end flanges of the shaping drum 5, presently again referred to and as is clearly shown in Fig. 2 of the drawing.

It will be noticed, by referring to Fig. 2, that the upper end of the chute 4 terminates in a receiving hopper 41, into which the dough chunks are dropped, and at the lower or discharging mouth of the said hopper 41, is mounted a pair of transversely disposed opposing rolls 6—6, one of which carries a chain wheel at its outer end over which takes a drive chain 9 that connects with a sprocket wheel 50 on the drum shaft 51, the latter being shown with a crank handle, it being understood that said sprocket wheel 50 may be coupled with any suitable driving power.

The drum 5 consists of a central annular rim 52 and two end sections, each of which comprises a band or collar 53 and an end flange 54, the collars 53 being of such diameter whereby to snugly slide edgewise within the rim 52, such formation of the drum providing for conveniently adjusting the drum for shaping different lengths of loaves.

In my present construction of dough shaping machine the curved bottom or concave comprises a pair of substantially semi-circular members 12, and they are edgewise slidable and telescopically arranged to thereby provide for readily widening or narrowing the concave to suit the set or lateral adjustment of the shaping drum 5 and for conveniently adjusting the concave members, as stated, the ends being bent to form guides 13 that lap over and are laterally slidable upon the cross pieces or bars 2 and 3 as is clearly shown in detail by Figs. 1 and 2.

The dough chute in my present construction is split to form a tongue 45, and the said tongue 45 is bent inwardly and has its lower end turned or coiled to form a transverse bead or rib 46 that forms a retarding element to hold back the dough as it is forced down the chute by the friction of the endless belt thereon and thereby effects, as it were, the usual "kneading" or "working" of the dough before it passes down into the shaping space between the drum and the concave.

I prefer to form the retarding element as a part of that portion of the chute that is cut or slitted, as stated, since when heavy sheet metal is used, there is sufficient rigidity to effect the "working" or "kneading" and also the expulsion of the gases contained within the dough and at the same time it provides against a possible clogging or excessive lumping of the dough at the entrance end of the shaping space for the reason that too great amount of dough pressure at such end will cause the retarder to slightly yield or move back.

From the foregoing taken in connection with the drawing, the complete arrangement of the parts that constitute my improved dough shaping machine, the manner of the operation and the advantages thereof, will be readily understood. Portions of the dough, of proper amount, are placed in the chute hopper and are drawn through the bottom thereof by the rolls 6—6 which feed the flattened dough down the inclined chute. The dough, as it passes down, see Fig. 2, engages the retarding element and is turned up or "kneaded," and as it drops from the retarder it passes into the shaping space, and as it is shaped it is carried forwardly and discharged onto a belt carrier, see Fig. 1, and is there picked up and put into the baking pan. To hold the dough from spreading out under the flanges of the shaping drum, the outer edges of the concave members 12 are turned up to form flanges 12ª and these lap over the outer face of the drum ends and form side closures for the space between the drum and the concave.

What I claim is:—

A dough shaping machine comprising a rotatable frame consisting of an annular rim and opposing flanged end sections telescopically connected with the annular rim, a supporting frame for the drum, a concave composed of two edgewise telescopic sections adjustably mounted upon the frame and coöperating with the drum to provide a dough passage, and means for feeding the dough into the said passage.

THOMAS H. WILLIAMS.

Witnesses:
T. M. McALISTER,
L. E. BELLMAN.

---

Copies of this patent may be obtained for five cents each, by addressing the "Commissioner of Patents, Washington, D. C."